(No Model.)

W. T. LEWIS.
BICYCLE BRAKE.

No. 471,845. Patented Mar. 29, 1892.

Witnesses.
A. Keithley
L. M. Thurlow

Inventor
William T. Lewis.
By H W Wells
Atty.

UNITED STATES PATENT OFFICE.

WILLIAM T. LEWIS, OF PEORIA, ILLINOIS.

BICYCLE-BRAKE.

SPECIFICATION forming part of Letters Patent No. 471,845, dated March 29, 1892.

Application filed August 13, 1891. Serial No. 402,533. (No model.)

*To all whom it may concern:*

Be it known that I, WILLIAM T. LEWIS, a citizen of the United States, residing at Peoria, in the county of Peoria and State of Illinois, have invented certain new and useful Improvements in Compound Bicycle-Brakes; and I do hereby declare that the following is a full, clear, and exact description of the invention, which will enable others skilled in the art to which it appertains to make and use the same.

This invention is for a brake designed to be used upon velocipedes and similar vehicles having elastic or rubber tires. It is so constructed that the friction necessary to produce the retarding of motion is transferred from the rubber or elastic tire of the wheel to a bit of soft metal or other substance, which, when worn out, can be replaced at trifling cost, and by these means avoid all unnecessary wear on the elastic tire of the wheel. It must be observed that some friction (a rub somewhere) is necessary to produce the retarding of motion. As ordinarily constructed, this friction is upon the elastic tire of the vehicle, and is produced by the direct pressure of a metal "spoon," as it is called, held upon the tire, which revolves against it. This has a tendency to wear or grind out the tire. A bit of metal or sharp stone may be caught and tear the elastic tire, and, in case of a pneumatic tire, may puncture it, thus resulting in serious delay and expense, sometimes in the destruction of the tire.

My brake is designed to obviate these difficulties and to furnish a substantial brake which will effectuate the necessary retarding of motion without destructive friction on the tire.

I accompany this specification by drawings which illustrate my invention, in which like parts are marked by like letters, and by reference thereto I will describe it.

Figure 1:
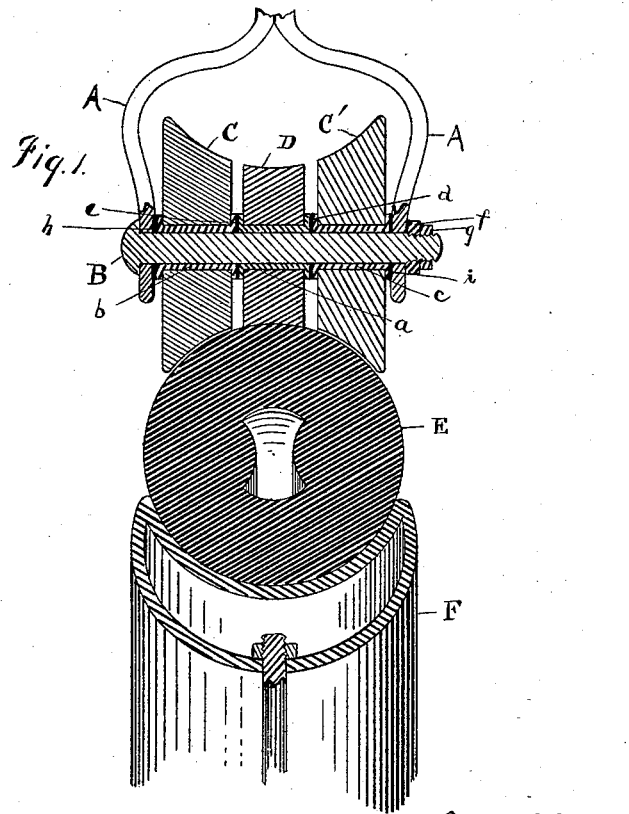
Figure 2:
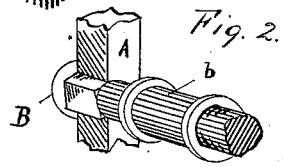
Figure 3:
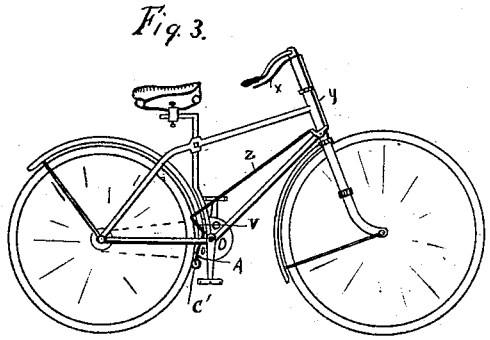

Figure 1 is a cross-section of a portion of the rim and tire of an ordinary bicycle with one of my brakes also shown in section thereon. Fig. 2 is a detail of the journal B of my brake, showing the metal bushing of the bearing-wheel at $b$. Part of one of the arms holding said wheels is also shown at A. The end of the journal B is square where it passes through this arm, as shown. Fig. 3 is a side elevation of a bicycle with one of my brakes thereon. The lever and the rods to connect it with the brake $y\ z$ are also shown. This brake may be placed upon either wheel of the machine, as desired.

I construct my brake as follows: I construct the bearing-wheels, as shown in C D C', Fig. 1, preferably of rubber, vulcanized to such an extent that they are reasonably hard, while they still contain a considerable degree of elasticity. These wheels are usually placed in groups of three, as shown in Fig. 1. They are substantially of the form shown in the drawings. The middle wheel is a true concave, and is smaller than the outside wheels, which are bevel concave to adapt them to fit upon the rounded tire E of the wheel. While the middle wheel is smaller, it is constructed to come into contact with the tire E before the others. A slightly-increased pressure of the lever will bring all the wheels into action. These wheels are very adhesive upon the tire and will not easily slip, but turn with the main wheel of the bicycle E. Each of these bearing-wheels is constructed upon a metal bushing, preferably of hardened brass, which must revolve with it. This bushing extends partially upon the flat side of each wheel. I mount these wheels upon a metal journal B, placing a soft-metal washer upon the journal upon each side of each wheel, as shown at $e\ d\ h\ i$. These metal washers $h$ and $i$ are detachably fastened to the arms A A by any convenient means, so as to be easily taken out, and when worn or cut out they can be replaced at a cost of a fraction of a penny. The wear of these washers produces the retarding of motion. A A are the arms for supporting these wheels upon the journal B. The journal passes through these arms and through the wheels, as shown. It is square at its end where it passes through the first arm. Its other extremity is fitted with a nut $f$ and a jam-nut $g$. The wheels are placed on the journal in position. The nut $f$ is then tightened until it clamps or pinches the ends of the arms A A together until they hold the wheels and washers stated with the requisite degree of firmness to permit the wheels to revolve, when the washers, as stated, stand still. The washers at the middle wheel move only with that wheel. Thus by the means stated I cause the wheels C D C' to turn hard enough when pressed upon the tire-wheel E to retard its motion by the wear of the washers. The arms A A unite on $v$, which is operated on by the lever $x$ and the rods $y$ $z$ in a manner which will be readily understood. There are many other ways of producing this friction which will readily occur; but I regard the form stated as the best.

I do not desire to be confined to three wheels, as two wheels will answer, and a fourth may be used; but I regard three wheels grouped as shown as the most effective form.

Having thus described my invention, what I claim, and desire to secure by Letters Patent, is—

1. In combination in a brake for a bicycle, the concave wheels C D C', the journal B, the washers $e$ $d$ $h$ $i$, the arms A A, and the nut $f$, all acting together in the manner and for the purpose specified.

2. In a brake for a bicycle, in combination, the wheels C D C', having the bushing $a$ $b$ $c$, having also soft-metal washers between each of the bushings, all mounted on the journal B, the arms A A, and the nut $f$, all acting together in the manner and for the purpose specified.

3. In a brake for a bicycle, in combination, the wheels C D C' and the soft-metal washers $e$ $d$ $h$ $i$, all mounted on the journal B, held and forced upon the tire E by a lever $x$ in the manner and for the purpose specified.

4. In a brake for a bicycle, the wheels C D C', held by the arms A A against the periphery of the wheels by means of the lever $x$, the washers of soft metal $e$ $d$ $h$ $i$, and the journal B, all acting together in the manner and for the purpose specified.

5. In a brake for a bicycle, the washers $e$ $d$ $h$ $i$, held by the compression of the arms A A upon the journal B by any convenient means, and the wheels C D C', adapted to take motion from the tire of the bicycle and to grind or wear upon the washers, as stated, thus producing the retarding of motion.

In testimony whereof I affix my signature in presence of two witnesses.

WILLIAM T. LEWIS.

Witnesses:
FRANK O. CUNNINGHAM,
JULIUS S. STARR.